(12) United States Patent
Fryshman

(10) Patent No.: US 12,324,081 B2
(45) Date of Patent: Jun. 3, 2025

(54) INDUCTION COOKING APPARATUS AND INDUCTION COOKWARE

(71) Applicant: Bernard Fryshman, Flushing, NY (US)

(72) Inventor: Bernard Fryshman, Flushing, NY (US)

(*) Notice: Subject to any disclaimer, the term of this patent is extended or adjusted under 35 U.S.C. 154(b) by 0 days.

(21) Appl. No.: 18/791,139

(22) Filed: Jul. 31, 2024

(65) Prior Publication Data

US 2024/0397587 A1    Nov. 28, 2024

Related U.S. Application Data

(60) Continuation of application No. 17/157,481, filed on Jan. 25, 2021, now Pat. No. 12,089,322, which is a division of application No. 15/876,293, filed on Jan. 22, 2018, now Pat. No. 10,904,955, which is a division of application No. 14/798,060, filed on Jul. 13, 2015, now Pat. No. 9,888,530, which is a continuation-in-part of application No. 14/078,297, filed on Nov. 12, 2013, now Pat. No. 9,084,299, which is a continuation-in-part of application No. 13/372,654, filed on Feb. 14, 2012, now Pat. No. 9,131,536.

(60) Provisional application No. 61/725,903, filed on Nov. 13, 2012, provisional application No. 61/442,369, filed on Feb. 14, 2011.

(51) Int. Cl.
*H05B 6/12* (2006.01)
*A47J 27/00* (2006.01)
*H05B 6/06* (2006.01)
*H05B 6/10* (2006.01)

(52) U.S. Cl.
CPC .......... *H05B 6/1209* (2013.01); *A47J 27/002* (2013.01); *H05B 6/06* (2013.01); *H05B 6/105* (2013.01); *H05B 6/12* (2013.01)

(58) Field of Classification Search
CPC ........ H05B 6/1209; H05B 6/06; H05B 6/105; A47J 27/002
USPC ....... 219/621, 620, 622, 624, 625, 626, 627, 219/663, 665, 667, 671, 676
See application file for complete search history.

(56) References Cited

U.S. PATENT DOCUMENTS 5,628,241 A * 5/1997 Chavanaz .............. H05B 6/129
99/468
5,665,263 A * 9/1997 Gaspard ............... H05B 6/1254
219/625

FOREIGN PATENT DOCUMENTS

DE    19845844 A1 *  4/2000   ........... H05B 6/1281

* cited by examiner

*Primary Examiner* — Quang T Van
(74) *Attorney, Agent, or Firm* — Bell & Manning, LLC

(57) ABSTRACT

An induction stove and induction cookware are disclosed herein. The induction stove includes a first arm, a second arm, and a third arm together forming an opening between the first arm and the second arm. At least one of the first arm, the second arm, and the third arm includes an induction source. The induction stove also includes rack disposed in the opening for supporting induction cookware.

12 Claims, 11 Drawing Sheets

INDUCTION COOKING APPARATUS AND INDUCTION COOKWARE

CROSS-REFERENCE TO RELATED APPLICATIONS

This application is a Continuation application of U.S. application Ser. No. 17/157,481, filed on Jan. 25, 2021, which is a Divisional application of U.S. application Ser. No. 15/876,293, filed on Jan. 22, 2018, which is a Divisional application of U.S. application Ser. No. 14/798,060, filed on Jul. 13, 2015, which in turn is a Continuation-In-Part application of U.S. patent application Ser. No. 14/078,297 filed on Nov. 12, 2013, and which is a Continuation-In-Part application of U.S. patent application Ser. No. 13/372,654 filed on Feb. 14, 2012, and which in turn claims the benefit of U.S. Provisional Patent Application No. 61/442,369 filed on Feb. 14, 2011, the entirety of each of which is incorporated by reference in its entirety herein. U.S. patent application Ser. No. 14/078,297 also claims the benefit of U.S. Provisional Patent Application No. 61/725,903, filed on Nov. 13, 2012, the entirety of each of which is also incorporated by reference herein.

FIELD

The present invention relates generally to the field of equipment for cooking and more particularly to an induction cooking apparatus and a method of induction cooking.

BACKGROUND

Induction cooking is similar to other forms of cooking in that it uses a heated cooking vessel such as a pot or a pan to transfer heat to the food contained in the vessel. Induction cooking differs in that the vessel itself is the source of the heat, receiving its energy through electromagnetic radiation which creates the heat in the walls of the vessel. The heat then reaches the food, from the vessel walls inward.

In order to function, the vessel must be made of a ferrous or similar material. Sometimes, an adaptor is used to enable a non-ferrous pot or pan to be used. The adaptor then becomes the source of the heat. Adaptors are sometimes called induction discs.

Despite the developments of the prior art there remains a need for an induction cooking apparatus which provides targeted application of heat.

OBJECTS AND SUMMARY

It is an object of the present invention to provide an induction cooking apparatus which provides targeted heating of food enabling elective cooking of different parts of the food.

Another object of the present invention is to provide a method for induction cooking which provides improved heating uniformity.

Another object of the present invention is to provide an induction cooking apparatus which incorporates pieces of metal of varying sizes and shapes which are distributed within the cooking vessel to vary the heating pattern.

Another object of the present invention is to provide an induction cooking apparatus in which ferrous metal inserts are inserted into food for the purpose of heating and cooking the food.

Yet another object of the present invention is to provide an induction cooking apparatus to incorporate a relatively small number of component parts which can be manufactured economically in volume, resulting in a low unit cost.

These and other objects and advantages of the present invention will become evident hereinafter.

In accordance with the present invention, an induction cooking apparatus includes a non-ferrous cooking vessel, a support structure, and a plurality of ferrous elements which are placed throughout the interior of the cooking vessel and are typically mounted on the support structure so that the source of heat is dispersed and distributed enabling a previously unavailable level of heat precision and control in the preparation of food. Alternatively, ferrous elements are placed outside of the non-ferrous vessel. Yet, alternatively, ferrous elements are place inside of the vessel and outside thereof—both of which may be used to heat food held by the vessel.

Ferrous and similar pieces of metal of varying shapes, sizes, number, and magnetic/conducting properties are distributed throughout the vessel. Each becomes a source of heat so that the food is cooked according to the specifications of the preparer. No longer does the heat travel only from the enveloping heated vessel, (or from the flame which is directed at the food). The heat can travel from a number of separate sources, from inside the cooking vessel, therefore enabling a new level of uniformity—or differentiation—as the case (and desire) may be. It shall be appreciated that the term "ferrous elements" is used herein for simplicity. The source of heat may be made of ferrous metal or other conductive material that can generate eddy current and thereby generate heat appropriate for cooking/heating food.

In accordance with another embodiment, an induction stove includes a first arm, a second arm, and a third arm together forming an opening. At least one of the first arm, the second arm, and the third arm includes an induction source. The induction stove also includes a rack disposed in the opening for supporting an induction cookware or ordinary cookware with ferrous elements suitably placed.

In accordance with yet another embodiment, an induction cookware includes a first compartment and a second compartment. The second compartment includes more ferrous elements than the first compartment.

In accordance with still another embodiment, an induction heater includes a holder and one or more teeth affixed to the holder. The holder is made of nonferrous material. The one or more teeth are made of ferrous material or other conductive material that can generate eddy current and thereby generate heat appropriate for cooking/heating food.

BRIEF DESCRIPTION OF DRAWINGS

Additional features and advantages of the present invention will be made clear in the following specification taken with the drawings in which.

DETAILED DESCRIPTION OF THE INVENTION

Figure 1:
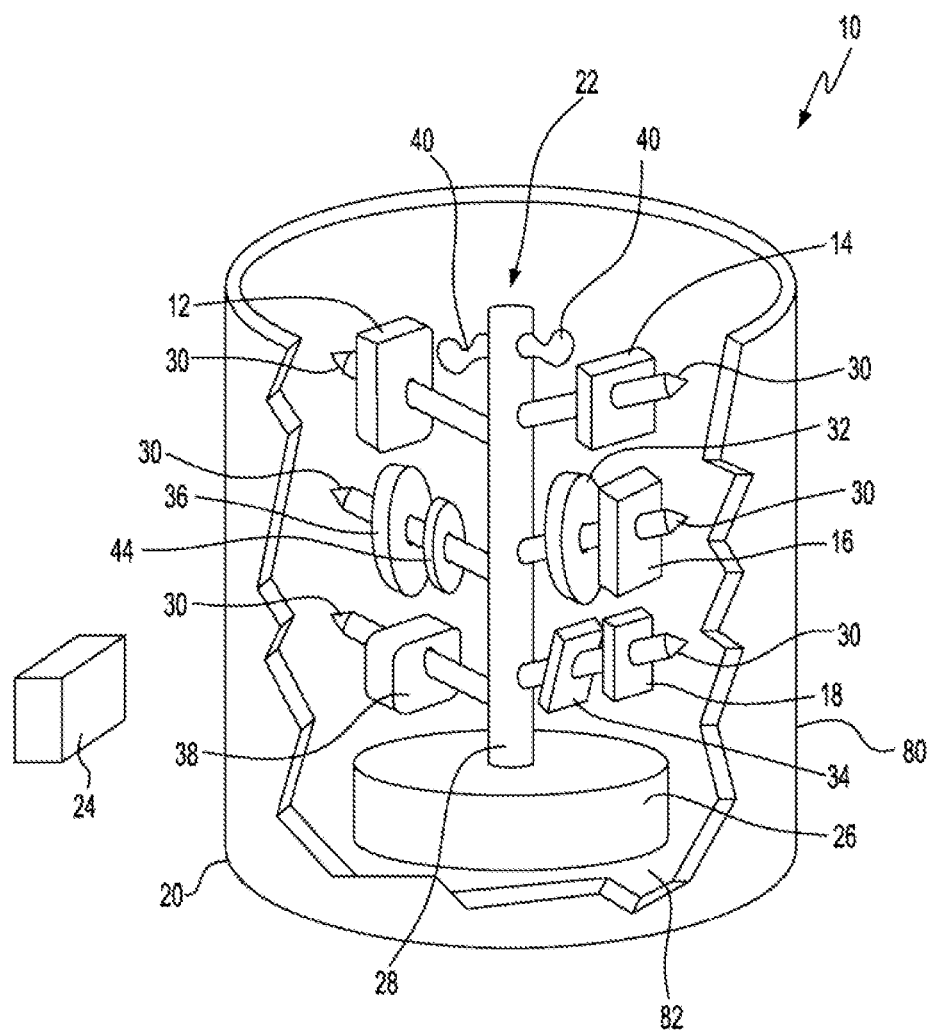
FIG. 1 is an overall perspective view of the induction cooking apparatus according to the present invention with the apparatus shown in use and with a portion of the apparatus shown broken away to reveal details of internal construction.

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

With reference to the drawings there is shown in FIGS. 1-7 an induction cooking apparatus 10 made in accordance with the present invention, with the apparatus 10 shown in use cooking food items 12, 14, 16, 18. The apparatus 10 includes a cooking vessel 20, a support structure 22 and a source of electro-magnetic radiation 24. The source of electro-magnetic radiation 24 is of conventional construction which is well known in the art and, accordingly, the source of electro-magnetic radiation 24 is represented schematically in FIG. 1 by a rectangular parallelepiped. The source of electro-magnetic radiation 24 is capable of producing radiation in a range of power levels and a range of frequencies. For example, a source electromagnetic radiation may consist of a coil of copper having an alternating electric current flowing therethrough in order to produce an oscillating magnetic field. The magnetic field induces an electric current in the ferrous elements and heat generated by resistance heats food that is in thermal communication with the ferrous elements. The source of electromagnetic radiation is interchangeably referred to as an "electromagnetic source," an "electromagnetic energy source," and an "electromagnetic radiation source" herein.

The cooking vessel 20 is a container of generally conventional design and may be made of a non-ferrous material or, alternatively, of a non-ferrous material with a ferrous bottom surface to facilitate two modes of cooking. Induction cooking is accomplished according to the present invention and also conventional cooking may be accomplished using a conventional stove or cook top. As shown in FIG. 1, the cooking vessel 20 has a side wall 80 and a generally flat bottom 82. The side wall 80 is made of a non-ferrous material and the flat bottom 82 may be either a ferrous or non-ferrous material.

The source of electromagnetic radiation 24 may be spaced apart from the container 20 as is shown in FIG. 1 or alternatively it may be attached to the side wall 80 of the container. A plurality of sources 24 of electromagnetic radiation may be utilized.

The support structure 22 is a key component of the present invention and is preferably made of a non-ferrous material which is capable of withstanding typical cooking temperatures. Appropriate materials for the support structure 22 have been found to be glass, aluminum and certain woods.

Figure 2:
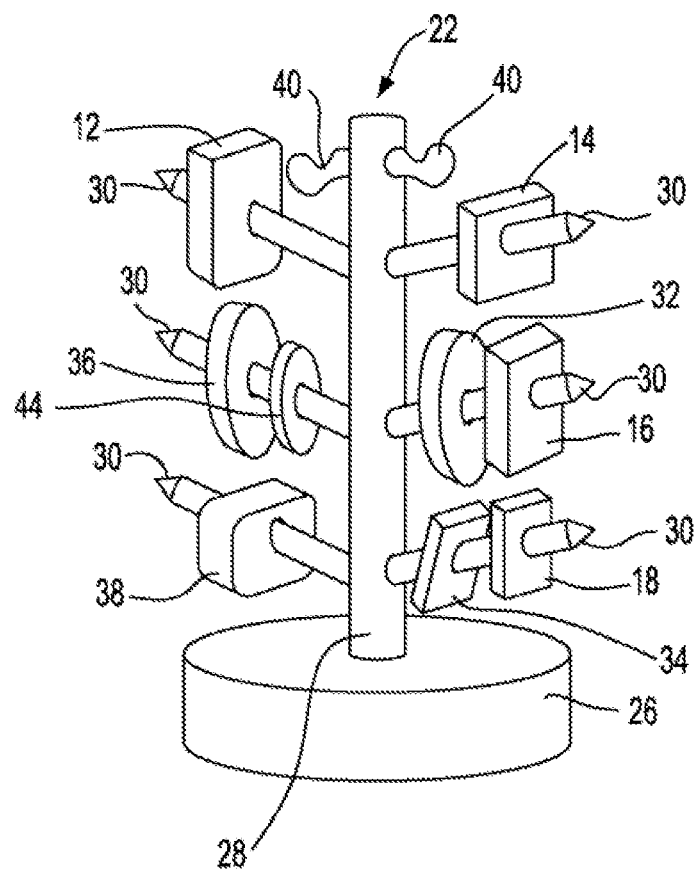
FIG. 2 is a perspective view of the support structure shown in FIG. 1 with the support structure shown removed from the cooking vessel.

As is best shown in FIGS. 1 and 2, the support structure 22 includes a base 26 and a central column 28 which projects upwardly from the base 26.

Along the central column 28 there is a plurality of branches 30 or hooks 40 on which ferrous elements 32, 34, 36, 38 or similar materials may be removably affixed according to the wishes of the person preparing the food. The food being cooked may be affixed to selected branches 30 by allowing the end of the branch 30 to pierce the solid food. Alternatively, ferrous elements 32, 34, 36, 38 are permanently attached to central column 28. As noted above, the term "ferrous elements" is used herein for simplicity. The source of heat may be made of ferrous metal or other conductive material that can generate eddy current and thereby generate heat appropriate for cooking/heating food.

Figure 4:
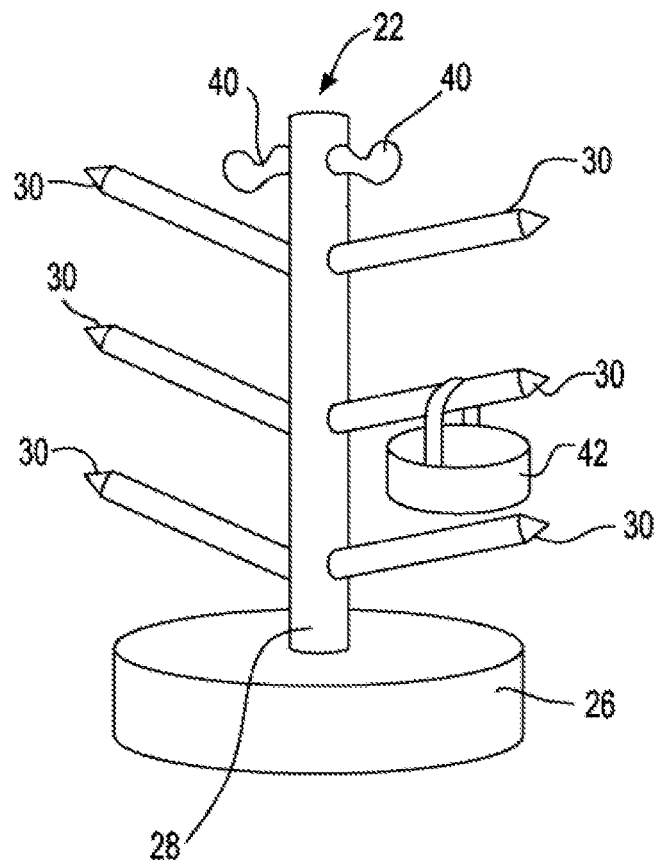
FIG. 4 shows a pail mounted on the support structure.

A ferrous or non-ferrous dish or pail 42 may be hung from a selected branch as shown in FIG. 4. Food of a loose or soft or liquid consistency may be placed in the pail 42 for the purpose of cooking.

During use, the ferrous elements 32, 34, 36, 38, which are hung from or attached to selected branches 30 of the support structure 22, are heated by induction in order to create the desired heating pattern. The ferrous elements 32, 34, 36, 38 may be of various shapes and number according to the cooking application. Included in these shapes are rectangular, circular, ellipsoidal, triangular and regular and irregular geometrical shapes. The size of the ferrous elements 32, 34, 36, 38 and the relative proximity of the ferrous elements 32, 34, 36, 38 to the food being cooked may be adjusted or varied by a user in order to create a desired heating pattern.

Figure 3:
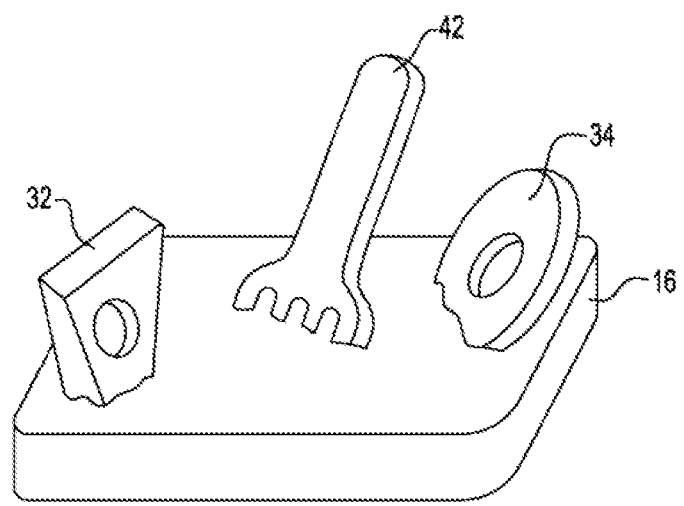
FIG. 3 is an alternative embodiment of the invention in which ferrous elements are inserted directly into food.

The ferrous element may also have various configurations including a household item such as an eating utensil 42 as is shown in FIG. 3.

During use, the source of electro-magnetic energy 24 creates heat within the ferrous elements 32, 34, 36, 38.

The ability to vary the size, shape and proximity of the ferrous elements 32, 34, 36, 38 to the food being cooked results in a previously unavailable level of precision and control in the preparation of food.

In another embodiment shown in FIG. 3, solid foods for which structures and hanging ferrous elements are unsuitable, elements 32, 34, 42 are provided with, for example, sharp edges which can be placed into the food at various places—or inserted into folds at specified locations. The heating (and cooking) will be precise, and once the process is over, the elements 32, 34, 42 are readily removed.

Figure 5:
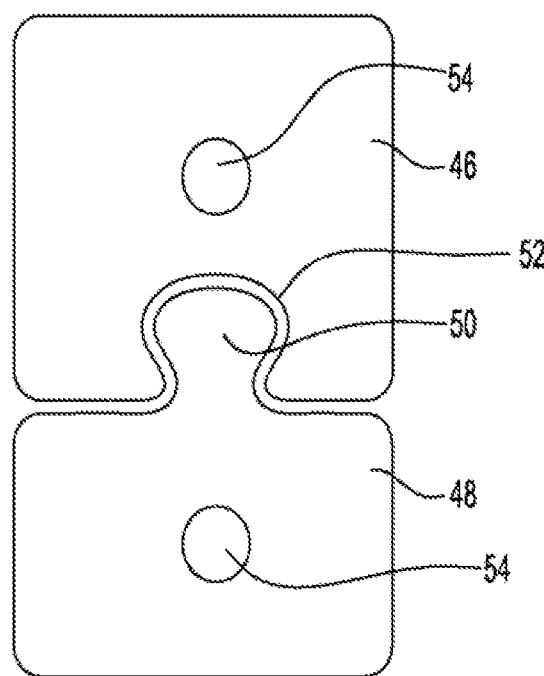
FIG. 5 shows a pair of ferrous elements joined together.

The ferrous elements can have different sizes, shapes compositions and magnetic properties. The ferrous element may be connected one to another either by mounting two or more ferrous elements 36, 44 on a single branch of the support structure as shown in FIG. 4 or alternatively providing a snap together or link together interface as shown in FIG. 5. Ferrous elements 46, 48 can be easily attached and detached as is shown in FIG. 5 ferrous element 48 includes a projecting tongue 50 while ferrous element 46 includes a receptacle 52 which accepts the tongue 50. Ferrous elements 46, 48 include apertures 54 for attachment to a branch 30.

The ability to vary the number, shape orientation and proximity to the food during the cooking process enables the user to achieve a previously unobtainable level of control and precision in the preparation of food.

The present invention also includes an induction cooking oven which is generally similar to the non-ferrous cooking vessel 20 and which is generally rectangular and box-like in configuration having a top, a bottom and four side walls with food disposed on ferrous or non-ferrous racks mounted within the oven. Ferrous elements 32, 34, 42 are inserted into the food as previously described. A plurality of sources of electromagnetic radiation 24 are disposed on the top wall and the four sidewalls.

The present invention provides a method for induction cooking which includes the following steps:
1. Placing a plurality of ferrous elements in proximity to food;
2. Subjecting the ferrous element and the food to electromagnetic radiation, thereby enabling the electro-magnetic energy to heat the ferrous elements and allowing the heated ferrous element to transfer heat to the food.

In addition, the present invention provides another method for induction cooking which includes the following steps:
1. Placing a plurality of ferrous elements in an area that is external to a cooking vessel;
2. Subjecting the ferrous element and the food to electromagnetic radiation, thereby enabling the electro-magnetic energy to heat the ferrous elements and allowing the heated ferrous element to transfer heat to the non-ferrous vessel and/or food.

In addition, the present invention provides another method for induction cooking which includes the following steps:
1. Inserting at least one ferrous element into food;
2. Subjecting the ferrous element and the food to electromagnetic radiation thereby enabling the electro-magnetic energy to heat the at least one ferrous element by induction and allowing the heated ferrous element to transfer heat to the food.

The embodiments set forth above are directed to a non-ferrous cooking vessel having a plurality of ferrous members mounted on a support structure disposed in the hollow or cavity of the vessel. The various ferrous members are heated by an electromagnetic energy source and the resultant output heat is used to heat the contents of the vessel. However, it will be understood by those of ordinary skill in the art that ferrous elements may be placed external to the cooking vessel and which serve the purpose of heating food within the vessel. External elements may be positioned above, below and/or on the side of the cooking vessel. Such external ferrous elements are positioned to be in thermal communication with food located in the vessel. External ferrous elements may be provided in addition to internal ferrous elements.

For example, in one embodiment of the invention, electromagnetic energy sources may be positioned in any of various locations outside of a non-ferrous cooking vessel. The electromagnetic energy is directed to ferrous members external or internal to the vessel.

Figure 6:
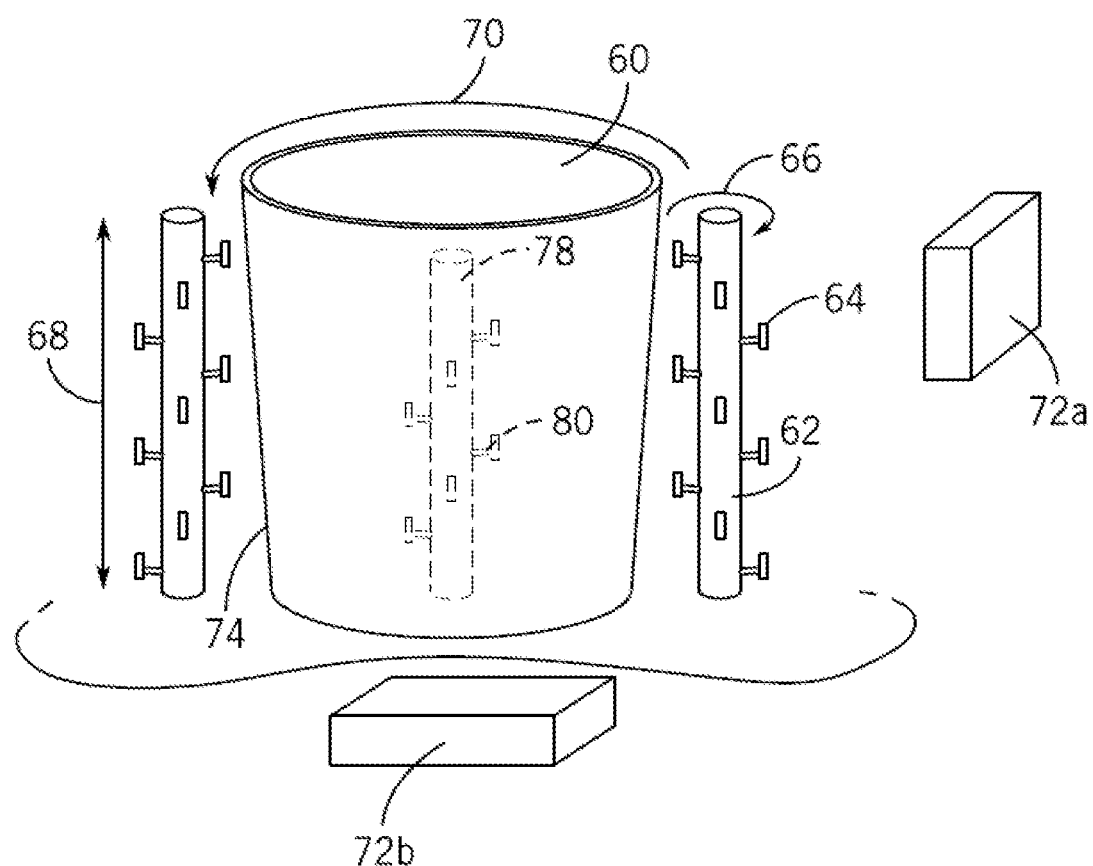
FIG. 6 shows a front view of an induction cooking apparatus having ferrous elements disposed externally to the cooking vessel according to an embodiment of the invention.

FIG. 6 shows a cooking vessel 74 having one or more support columns 62 positioned near the outside walls thereof. Support columns 62 have one or more ferrous elements 64 mounted thereon. The support members 62 are shown oriented with their longitudinal axes substantially parallel to the walls of the vessel, but other orientations are possible in other embodiments of the invention. Moreover, although two support members 62 are shown, the invention is not limited to two external support members 62 and any number of support members 62 are within the teaching of the invention.

In one embodiment of the invention support member 62 is rotatable about its longitudinal axis (in the direction indicated by arrow 66), for example by way of an associated motor.

Alternatively or additionally support member 62 is movable in an upward and downward direction with respect to the floor of the vessel (as indicated by arrow 68), for example by way of a linear motion track or a bidirectional motor.

Still in another embodiment of the invention, the vessel itself is rotatable (e.g. by way of a motor driven roundtable) with respect to one or more support columns (as indicated by arrow 70).

Electromagnetic radiation emanating from electromagnetic energy sources 72 *a* and/or 72 *b* is used to heat ferrous elements in or near the vessel or both. In the example shown in FIG. 6, electromagnetic energy source 72 *a* or 72 *b* directs radiation at the ferrous elements mounted on support member 62 and it thereby causes heat to be generated. The generated heat is used to warm food located in the vessel which is in thermal communication with the ferrous elements 64. Food is introduced into the vessel through opening 60. The vessel may have a corresponding cover (not shown) that is used to cover the vessel during cooking.

It will be understood that more than one electromagnetic energy source may be provided in different embodiments of the invention. For example, FIG. 6 shows a first electromagnetic source 72 *a* positioned to the side of cooking vessel 74 and a second electromagnetic source 72 *b* is positioned below cooking vessel 74. It will be understood that the number of electromagnetic sources or the placements thereof shown in FIG. 6 are exemplary and more or less than two sources may be provided and electromagnetic sources may be positioned in various locations in different embodiments of the invention.

It will be understood that while the vessel of the invention may be of a variety of non-ferrous materials. Ferrous elements can be mounted on the walls of the vessel itself or they may be placed in or near the vessel (e.g. an internal support column 78 with ferrous members 80 branching off thereof— as shown in FIG. 6).

In one embodiment of the invention, movable support members 62 which have ferrous elements 64 mounted thereon may be coupled to a heat sensor inside the vessel. The heat sensor will detect areas of the vessel that are cooler with respect to other areas and it will direct ferrous elements to such cooler areas to achieve more targeted heating. Alternatively, the ferrous elements may be moved randomly or at programmed intervals to insure uniform heating.

It will be understood by those of ordinary skill in the art that a cooking vessel 74 may have ferrous elements 80 positioned in the interior thereof, or ferrous elements 64 positioned in the exterior thereof- or a combination of both. For example, FIG. 6 shows a vessel 74 having ferrous elements 80 attached to a column 78 in the hollow of the vessel. Additional, ferrous elements 64 are mounted on columns 62 outside of the vessel. In one embodiment of the invention, ferrous elements 64 and ferrous elements 80 are independently controllable. For example, electromagnetic radiation source 72 *a* may be used to heat ferrous elements 64 on the outside of the vessel and electromagnetic radiation source 72 *b* may be used to heat ferrous elements 80 in the inside of the vessel. In one mode of cooking only electromagnetic radiation source 72 *b* is activated to heat ferrous elements 80, however, in a second mode of heating both electromagnetic radiation sources 72 *b* and 72 *a* are utilized to respectively heat ferrous elements 80 and 64.

Although in the embodiment shown in FIG. 6, there are ferrous elements both inside of and outside of the cooking vessel—it will be understood that ferrous elements may be mounted solely inside or solely outside of a cooking vessel in different embodiments of the invention. In addition, it will be understood that in some embodiment of the invention, ferrous elements may be permanently attached to a supporting structure, whereas, in other embodiments of the invention, ferrous elements may be selectively attached to support structures or to the vessel in a non-permanent manner.

Figure 7:
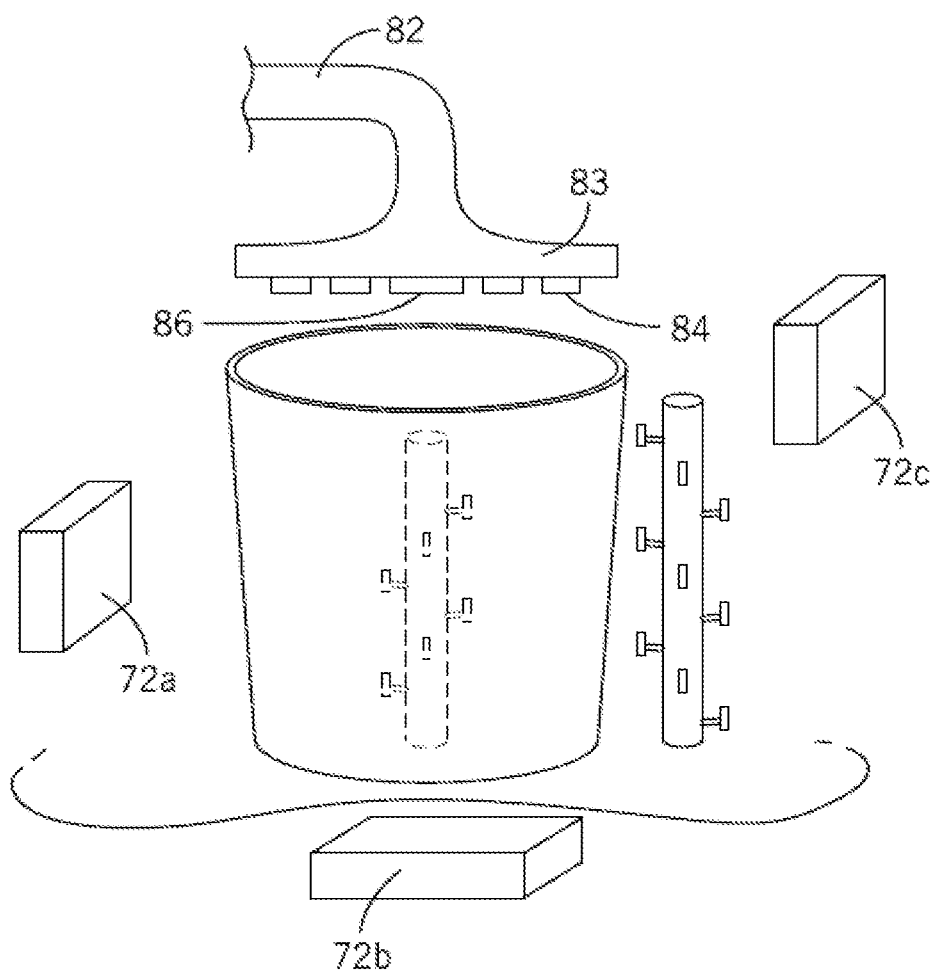
FIG. 7 shows a front view of induction cooking apparatus having external ferrous elements, both above and along the side wall of the non-ferrous cooking vessel according to an embodiment of the invention.

FIG. 7 shows an alternate embodiment of the invention whereby a support member 82 atop of the vessel is provided with an arm 83 which has ferrous elements 84 and/or an electromagnetic source 86 affixed thereto. Arm 83 is positioned above of the opening 60 of the vessel. Ferrous elements 84 receive electromagnetic radiation from one or more external sources, such as electromagnetic source 72 *c* and thereby radiate heat downward into the vessel. Electromagnetic source 86 radiates and thereby heats ferrous elements either in the vessel or outside of the vessel as described above.

Figure 8:
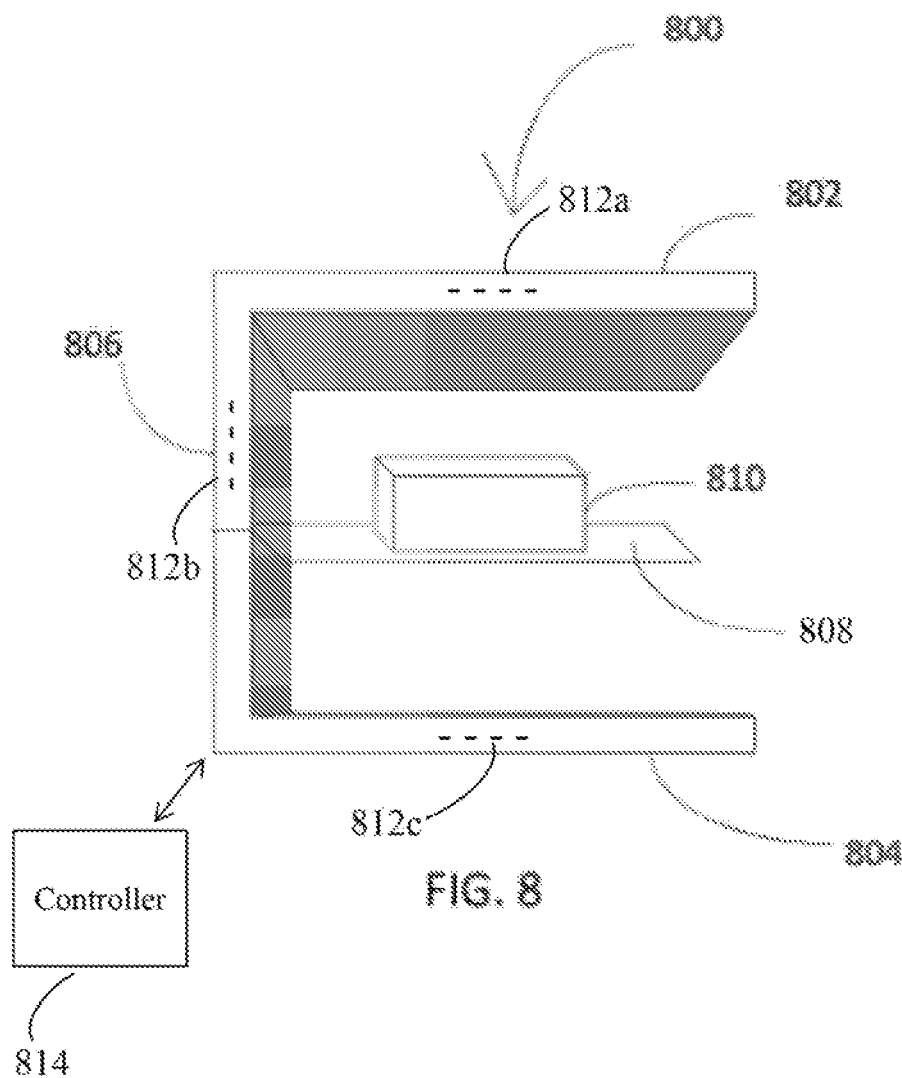
FIG. 8 is a perspective view of an induction stove according to an illustrative embodiment with the induction stove shown in use.

FIG. 8 is a perspective view of an induction stove 800 according to an embodiment with the stove 800 shown in use. The induction stove 800 is intended to be used in conjunction with induction cookware 810. The induction stove 800 is an electromagnetic radiation source which includes a first arm 802, a second arm 804, and a third arm 806 together forming an opening between the first arm 802 and the second arm 804. At least one of the three arms 802, 804, and 806 has an induction source, for example, a coil of copper wire (e.g., induction sources 812 *a*, 812 *b*, and 812 *c*). In one embodiment, all three arms 802, 804, and 806 can include induction sources. The induction cookware 810 may be a container with one or more ferrous elements inside, for example, pieces of ferrous metal. Structures of the induction cookware 801 will be discussed in further detail below. When in use, an alternating electric current flows through the induction sources of the stove 800 and results in an oscillating magnetic field which induces a magnetic flux in the opening between the first arm 802 and the second arm 804. The ferrous elements inside the induction cookware 810, being placed at the opening of the stove 800, are repeatedly magnetized by the magnetic flux. This produces eddy currents in the ferrous elements, which because of the resistance of the ferrous elements, heat them. The ferrous elements in turn heat the food surrounding it in the induction cookware 810. In this way, heating can take place from within the food if desired.

In some embodiments, each of the arms 802, 804, and 806 has an induction source (e.g., the induction sources 812 *a*, 812 *b*, and 812 *c*) and each induction source can be controlled separately. As such, the power and the frequency of the electromagnetic radiation in each arm can be independently controlled. Similarly, controller 814 allows each of the arms 802, 804, 806 to remain active (or on) for varying amounts of time to control the distribution of heat during the cooking process. In some embodiments, only one or two of the arms 802, 804, and 806 have induction sources.

As shown in FIG. 8, the induction stove 800 further includes a rack 808 disposed in the opening between the first arm 802 and the second arm 804 for supporting the induction cookware 810. The rack 808 extends from the third arm 806. In some embodiments, the rack 808 is supported by the first arm 802 and/or the second arm 804. In other embodiments, the induction stove 800 may include multiple racks.

The induction stove 800 can be turned on or off manually or automatically. In some embodiments, the induction stove 800 includes a manually controlled switch (not shown in the present figures) connected to a power source. In some embodiments, the switch receives signals from a detector (e.g., photodetector) which detects the presence or absence of an induction cookware at the opening and triggers the switch responsive to detection of the presence or absence of the cookware.

The induction stove 800 may be built in different sizes for different intended uses. For example, stoves for occasional use in the home may be larger than stoves for individual use at a restaurant table. Furthermore, in some embodiments, the length of the third arm 806 is adjustable so that the induction stove can be made adaptable to cookware of different sizes. For example, the third arm 806 may be composed to two portions that slidably mate with one another such that the third arm 806 can be extended and retracted. The third arm 806 can also include a locking mechanism such that the third arm 806 can be maintained in the desired position.

It shall be appreciated that the configuration shown in FIG. 8 is provided for purposes of illustration only. Other embodiments may include fewer, more, or different components than those illustrated in FIG. 8. In some embodiments, the connections between the first arm 802 and the third arm 806 and between the second arm 804 and the third arm 806 are rounded corners. In some embodiments, the induction stove 800 further includes a door and walls to form an enclosure together with the arms 802, 804, and 806. The door may be made of glass. The walls may be made of nonferrous material and may have slots/grooves for racks.

As discussed above, the induction cookware 810 may be a container with one or more ferrous elements inside, for example, pieces of ferrous metal. As noted above, the term "ferrous elements" is used herein for simplicity. The source of heat may be made of ferrous metal or other conductive material that can generate eddy current and thereby generate heat appropriate for cooking/heating food. The container is made of nonferrous material, for example, plastic or glass. In some embodiments, the container is a disposable paper bag. In some embodiments, the container is a tray with ferrous elements inside. In other embodiments, the induction cookware 810 can itself be formed from ferrous material. In some embodiments, food may be packed in packaging that is configured for use in an induction environment. For example, a stick of butter may be wrapped in a material which will heat up in an induction environment, but which would otherwise be discarded like any other wrapper.

The induction stove 800 has advantages over microwave ovens by virtue of the flexibility of its shape and configuration. The need for safety and shielding considerations of microwave ovens may dictate low limits on size and weight of food that can be cooked by microwave ovens. There are no such limits on food that can be cooked by the induction stove.

Figure 9:
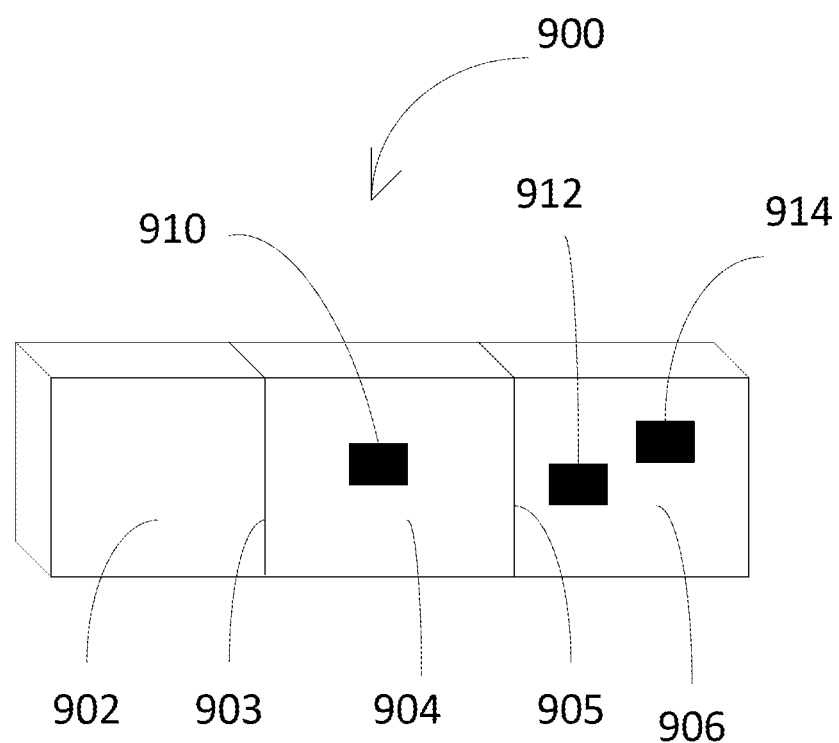
FIG. 9 is a perspective view of an induction cookware used in conjunction with the induction stove of FIG. 8 according to an illustrative embodiment.
Figure 10:
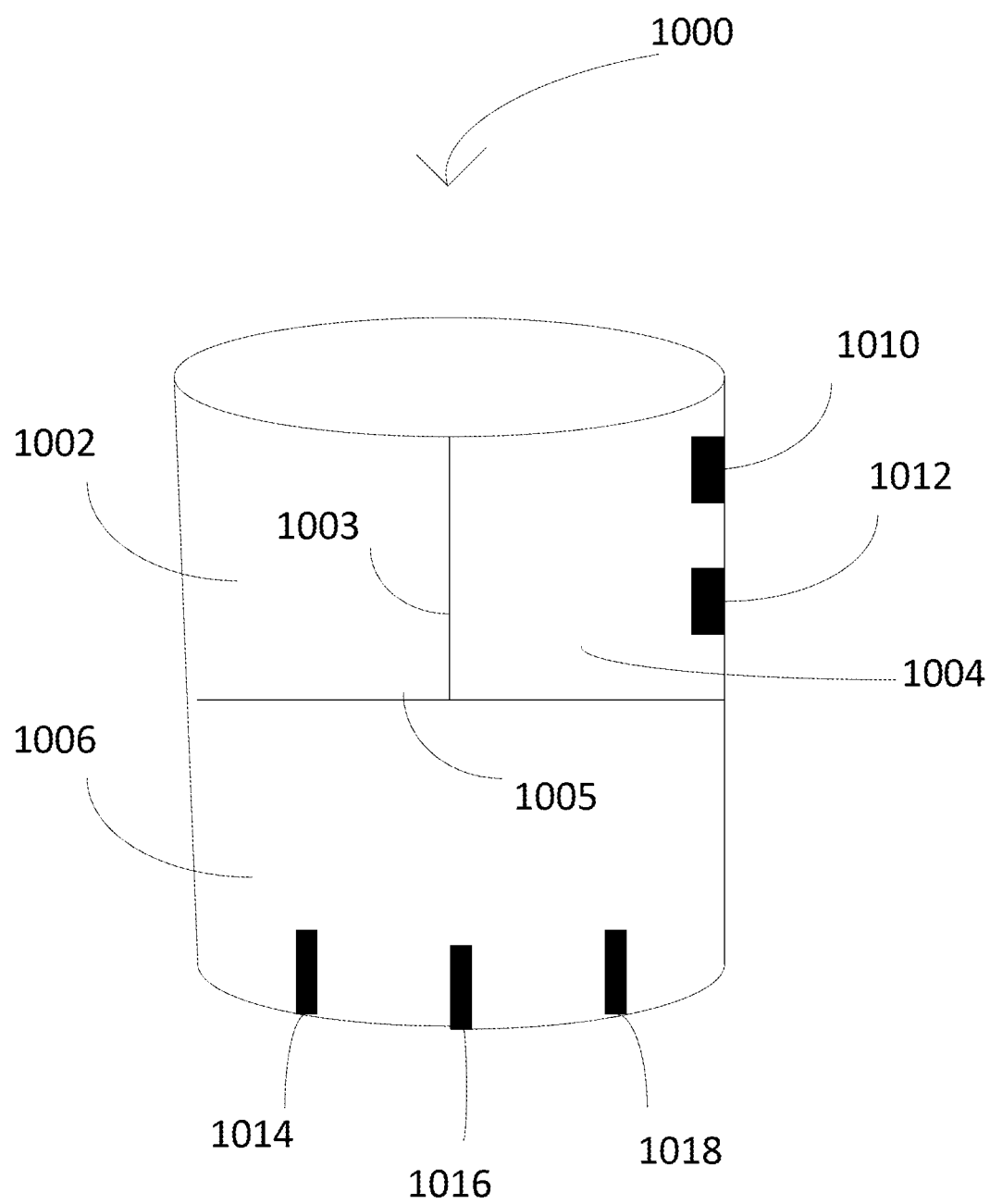
FIG. 10 shows induction cookware used in conjunction with the induction stove of FIG. 8 according to another illustrative embodiment.

FIGS. 9 and 10 show two embodiments of induction cookware that can be used in conjunction with the induction stove 800. Referring to FIG. 9, an induction cookware 900 is a container including a first compartment 902, a second compartment 904, and a third compartment 906 separated by dividers 903 and 905. The container is made of nonferrous material, for example, plastic or glass. There are no ferrous elements in the first compartments 902. The second compartment 904 has one or more ferrous elements 910 inside. The third compartment 906 has more ferrous elements 912 and 914 inside than the second compartment 904. When the induction cookware 900 is placed on the rack 808 of the induction stove 800, food in the third compartment 906 will be heated the most because the third compartment 906 has the most ferrous elements 912 and 914. Food in the second compartment 904 will be heated moderately and food in the third compartment 906 will not be heated or will slightly receive heat by being in contact with the second compartment 904. In this way, food at different compartments of the container can be heated to different levels, as desired. In alternative embodiments, different numbers of ferrous elements may be used, and the distribution of ferrous elements in the compartments can also be varied based on the food being cooked in each compartment and the desires of the user.

The ferrous elements 910, 912, and 914 may be covered/coated with an inert material to prevent the ferrous material from imparting a metallic flavor to food placed in the compartments. In some embodiments, the ferrous elements 910, 912, and 914 may be clad in glass, plastics, ceramic, etc., which will prevent a metallic taste from leaching off into food. The cladding may be permanent or temporary. The ferrous elements 910, 912, and 914 may be removably fixed on the walls of the respective compartments, for example, being inserted into slots/grooves on the walls of the respective compartments. In some embodiments, there are hooks on the walls of the compartments. In such an embodiment, the ferrous elements can have holes thereon for hanging on the hooks, as shown in FIG. 5.

In some embodiments, the ferrous elements 910, 912, and 914 themselves in the cookware can be sources of radiation to heat themselves and/or other nearby pieces of ferrous metal. As a result, each element itself can become heated through a current flowing from its own electromagnetic source. In such an embodiment, a power source such as a battery can be incorporated into the ferrous elements to provide power to the sources of radiation. In an alternative embodiment, the ferrous elements can receive power through a wired connection with a power source.

As shown in FIG. 9, the compartments 902, 904, and 906 are separated by the dividers 903 and 905. The dividers 903 and 905 may be plastic sheets inserted between the top and the bottom of the container. The size of the compartments 902, 904, and 906 may be changed by, for example, inserting the dividers 903 and 905 into different slots/grooves along the top and/or the bottom of the container. In this manner, the compartments 902, 904, and 906 may be reconfigured. In some embodiments, the compartments 902, 904, and 906 are drawers that can be inserted into the container. In some embodiments, the compartments 902, 904, and 906 may be hooked on to each other. In some embodiments, the container may include doors or other openings, into which food to be cooked can be inserted or removed at any point of the cooking process. In alternative embodiments, additional or fewer dividers may be used such that more or fewer compartments are formed. In some embodiments, the compartments are formed by packages of the food. The packages will heat up on an induction environment and have spacers built therein. The packages may be a baby bottle or a "cup of soup," for example.

It shall be appreciated that the configuration shown in FIG. 9 is provided for purposes of illustration only. Other embodiments may include fewer, additional, or different components than those illustrated in FIG. 9. In some embodiments, the induction cookware 900 may include more or fewer than three compartments, and the compartments can either be static or configurable through the use of dividers. In some embodiments, the induction cookware 900 may be double-layered or multiple-layered. Besides use in the home, the induction cookware 900 may also be used in a commercial setting, for example, in a restaurant or commercial food preparation facility. As just one example, the induction cookware may be used in an assembly line in which appropriate amounts of food and numbers of ferrous elements are placed into each compartment of the container by workers or machines on the assembly line.

Now referring to FIG. 10, which shows another induction cookware 1000 that can be used in conjunction with the induction stove 800. The induction cookware 1000 is a cup-shaped container including a first compartment 1002, a second compartment 1004, and a third compartment 1006 separated by dividers 1003 and 1005. The cup-shaped container is made of nonferrous material, for example, plastic or glass. In the embodiment illustrated in FIG. 10, there are no ferrous elements in the first compartment 1002. The second compartment 1004 has ferrous elements 1010 and 1012 inside. The third compartment 1006 has more ferrous elements 1014, 1016, and 1018 inside than the second compartment 1004. The ferrous elements 1010, 1012, 1014, 1016, and 1018 are similar to the ferrous elements 910, 912, and 914 in FIG. 9. The dividers 1003 and 1005 are similar to the dividers 903 and 905 in FIG. 9. In some embodiments, a portion of the divider 1005 that is between the second compartment 1004 and the third compartment 1006 has holes thereon so that food in the second compartment 1004 can drip into the third compartment 1006 under some conditions, for example, when the food is melting.

The induction cookware 1000 allows a cooking process which used to require multiple steps to take place simultaneously in a single vessel. Take the preparation of a macaroni and cheese meal as an example. Macaroni and water can be placed into the third compartment 1006, solid cheese into the second compartment 1004, and vegetables into the first compartment 1002. The induction cookware 1000 can then be placed, for example, on the rack 808 of the induction stove 800. Since the third compartment 1006 has the most ferrous elements, macaroni and water in the compartment 1006 will receive the most heat and be boiled. The second compartment 1004 has fewer ferrous elements and the cheese therein will be moderately heat. In an embodiment in which the second compartment 1004 is separated from the third compartment 1006 by a grate or screen, the cheese will, as it melts, drip into the third compartment 1006 and mix with the macaroni. The first compartment 1002 has no ferrous elements and slightly receives heat by being in contact with the second and third compartments 1004 and 1006. The vegetables therein will be just warm. As such, the cooking process is simplified compared to the conventional method. Traditionally, when making the meal, macaroni, cheese, and vegetables are prepared separately in multiple pots with multiple steps and then manually combined.

It shall be appreciated that the configuration shown in FIG. 10 and the example of making macaroni cheese meal are provided for purposes of illustration only. Other embodiments may include fewer, more, or different components/steps than those illustrated in conjunction with FIG. 10. A skilled cook can configure the induction cookware 1000 through the use of varying numbers/sizes of ferrous elements to distribute heat within the container for numerous different applications and types of cooking.

Figure 11:
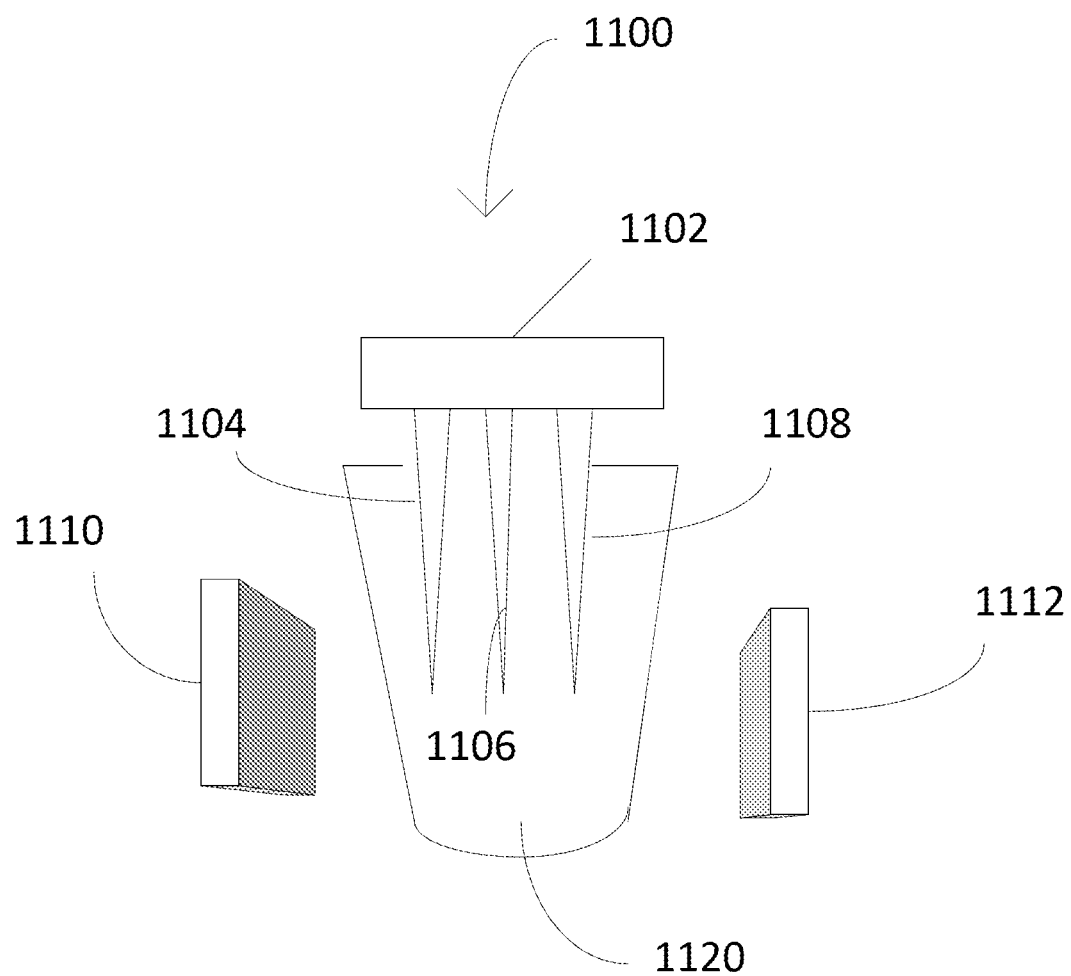
FIG. 11 shows an induction heater according to an illustrative embodiment with the heater shown in use.

Now referring to FIG. 11, which shows an induction heater 1110 in use according to an embodiment. The induction heater 1110 is in the shape of a multi-teeth fork which includes a holder 1102 and three teeth 1104, 1106, and 1108, preferably, with sharp ends. The holder 1102 is made of nonferrous material, for example, plastic or wood. The teeth 1104, 1106, and 1108 are made of ferrous metal and affixed to the holder 1102. In some embodiments, the teeth 1104, 1106, and 1108 are inserted into slots/grooves on the holder 1102. In some embodiments, the teeth 1104, 1106, and 1108 are attached to the holder 1102 with glue. The induction heater 1110 is used in conjunction with a source of electromagnetic radiation, for example, the induction stove 810 or sources 1110 and 1112 of conventional construction as shown in FIG. 11.

It shall be appreciated that the configuration of the induction heater 1110 as shown in FIG. 11 is provided for purposes of illustration only. Other embodiments may include fewer, more, or different components than those illustrated. For example, the induction heater may have more or fewer teeth. In some embodiments, the teeth are of different size and shape.

The induction heater 1110 may be used to heat fluid. As shown in FIG. 11, the induction heater 1110 is immersed in fluid in a cup 1120 and placed in a changing electromagnetic field generated by the sources 1110 and 1112. The induction heater 1110 may be used to defrost frozen food or heat solid food. When defrosting frozen food, the ferrous teeth 1104, 1106, and 1108 are placed in contact with the food. The heat generated on the ferrous teeth 1104, 1106, and 1108 will then heat the frozen food. When cooking solid food, the ferrous teeth 1104, 1106, and 1108 can be inserted into portions of the food that are desired to be well cooked. For example, a steak can be prepared such that it is well done inside and raw outside. Similarly, boiling can take place at one side of a pot, and not on the other.

The induction cookware and the induction heater are given here as examples of kitchen utensils incorporating induction heating. Functionality of the ferrous heating elements may be extended to other utensils. For example, a ladle made of plastic may have hooks or slots for optional addition of a ferrous heating element. Similarly, a spatula, blender, wok, mixing bowl, tea pot, bread pan, oven, toaster and other kitchen utensils may be designed to take advantage of this new distributed heat method of cooking. For example, an oven or a toaster may have ferrous heating elements installed. Depending on the placement of ferrous heating elements in the oven or the toaster, heat will be emitted from all directions. In some embodiments, the oven or the toaster may have elements on the top and the bottom only. In some embodiments, pots with ferrous heating elements installed need no longer be cylindrical—it is the placement of ferrous elements which determine the amount and nature of cooking.

The various induction cooking apparatuses disclosed herein allow users significant flexibility and options for the preparation of food. The ferrous elements discussed herein can be individually controllable with respect to the amount of heat that they generate and/or the amount of time that they remain on to generate heat. In traditional cooking methods, the food is often surrounded by a source of heat which cooks the food as a whole. The orientation of the food item may influence the rate and/or degree to which the item is cooked, but there is typically no way to control the uniformity of heating other than to manually reposition the food item. The induction cooking apparatuses of the present disclosure solve this problem and allow non-uniform heating by the placement, size, shape, and timing of the ferrous elements used to deliver heat to the food. For example, a solid or liquid mass of food can be heated at high heat by placing a ferrous element of large size and/or power proximate to the food. If less heat is desired, a different ferrous element (i.e., smaller and/or differing in shape) can be used, or the ferrous element can be positioned further away from the food or triggered on/off by a programmable controller to deliver intermittent heat to the food.

In a liquid food item, a support structure can enable the user to place ferrous elements in a variety of locations in or surrounding the liquid. The liquid food can therefore be heated from the inside out, from the inside and outside, or just from the outside depending on the preferences of the user. A user can also position elements to induce a convection current within a cooking container to avoid having to manually mix the food.

As used herein, the term "cook" may include boil, fry, bake, roast, broil, grill, stew, simmer, braise, steam, blanch, poach, toast, sauté, stir-fry, barbeque, seal, pas-boil, pre-cook, pan-fry, pan-broil, deep-fry, coddle, blacken steep, percolate, or any other process in which heat produce a chemical reaction in food. The term "heat" is sometimes included in the category of "cook," but may also mean to make something hot. For example, "heat" may include warm, scald, melt, defrost, reheat, liquefy, etc. "Heat," as applied to food and distinct from "cook," would generally cause a physical change to an already cooked food.

It shall be appreciated that the configurations of induction cook apparatus and cookware disclosed herein are for illustration only. There may be all kinds of variations. For example, the ferrous elements can be designed to be able to rotate, revolve, move up and down, or do any combination in a liquid or gaseous medium. The fact that induction source need not be at the bottom of a pot, and that heating can be carefully targeted, makes it possible to add variations by careful placement of the energy source. For example, a ferrous metal can be placed to surround water flowing from a cold water faucet could so that the water is heated when flowing.

What is claimed is:

1. An induction heater comprising:
    a holder comprising non-ferrous material; and
    a plurality of teeth spaced apart from one another and affixed to the holder, wherein each of the plurality of teeth comprises a ferrous material, and wherein each of the plurality of teeth has a pointed end; and
    wherein the plurality of teeth are configured to be heated via an electromagnetic radiation source to heat a substance.

2. The induction heater of claim 1, wherein each of the plurality of teeth is within a slot on the holder.

3. The induction heater of claim 1, wherein each of the plurality of teeth is affixed to the holder with an adhesive.

4. The induction heater of claim 1, wherein the holder comprises wood.

5. The induction heater of claim 1, wherein the holder comprises plastic.

6. The induction heater of claim 1, wherein the plurality of teeth comprises three teeth.

7. A method for forming an induction heater, the method comprising:
    forming a holder from non-ferrous material; and
    forming a plurality of teeth from a ferrous material, wherein the forming includes forming a point at an end of each tooth in the plurality of teeth; and
    affixing the plurality of teeth to the holder such that the plurality of teeth are spaced apart from one another, wherein the plurality of teeth are configured to be heated via an electromagnetic radiation source to heat a substance.

8. The method of claim 7, further comprising forming a plurality of slots in the holder.

9. The method of claim 8, further comprising mounting the plurality of teeth in the plurality of slots.

10. The method of claim 9, further comprising applying an adhesive to one or more of the plurality of teeth and the plurality of slots to secure the plurality of teeth in the plurality of slots.

11. The method of claim 7, wherein the holder is formed from wood or plastic.

12. The method of claim 7, wherein the plurality of teeth comprises three teeth.

\* \* \* \* \*